June 2, 1931. F. W. SCHMITHALS 1,808,008
AUTOMATIC BRAKE
Filed June 30, 1930
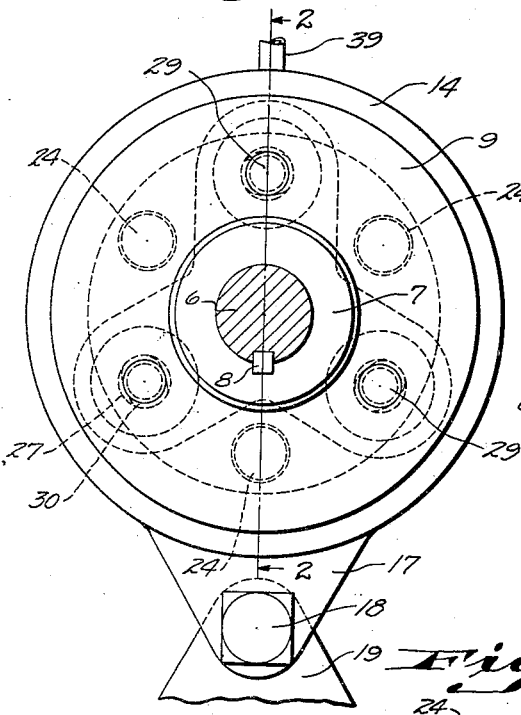
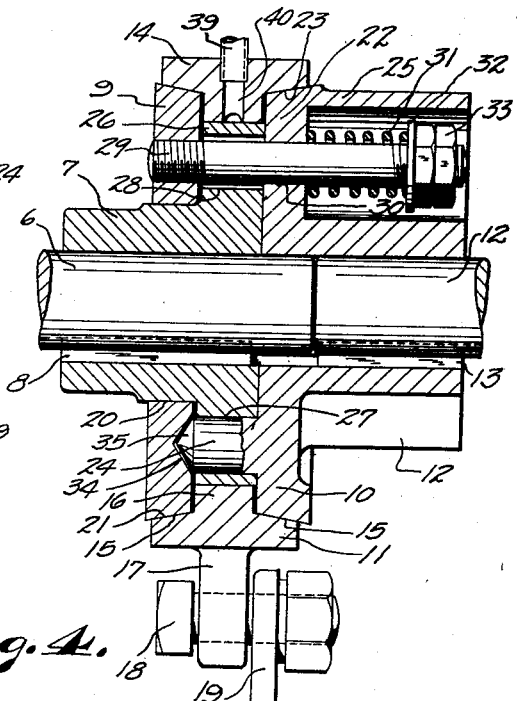
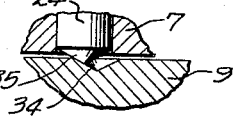
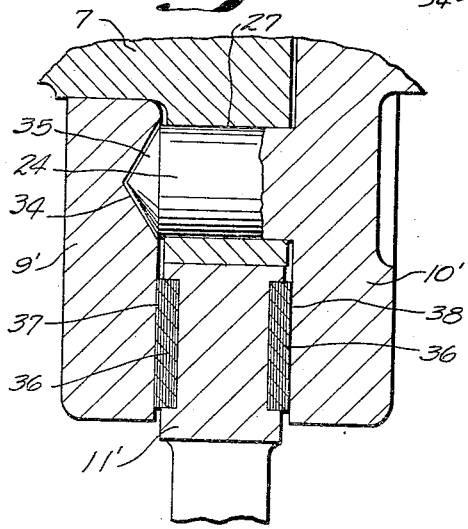
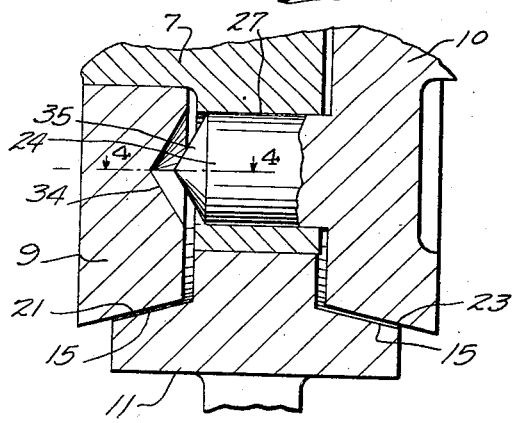
INVENTOR.
Frederick W. Schmithals
BY
Louis O. French
ATTORNEY.

Patented June 2, 1931

1,808,008

UNITED STATES PATENT OFFICE

FREDERICK W. SCHMITHALS, OF MILWAUKEE, WISCONSIN

AUTOMATIC BRAKE

Application filed June 30, 1930. Serial No. 464,901.

The invention relates to automatic brakes.

The object of the invention is to provide an automatic brake of simple construction wherein the movable brake members are released and revolve with the driven member so long as the same is rotated by the drive member, but as soon as the drive member stops, the brake members engage with the fixed element of the brake and prevent or arrest the movement of the driven member. More particularly in the present instance the drive for the driven member from the drive member is through one of the releasable brake members.

The invention further consists in the several features hereinafter set forth and more particularly defined by the claims at the conclusion hereof.

In the drawings, Fig. 1 is an end elevation view of an automatic brake mechanism embodying the invention;

Fig. 2 is a vertical sectional view taken on the line 2—2 of Fig. 1;

Fig. 3 is an enlarged detail sectional view of parts shown in Fig. 2 showing them in release position;

Fig. 4 is a detail sectional view taken on the line 4—4 of Fig. 3;

Fig. 5 is an enlarged detail sectional view similar to Fig. 2 showing certain modifications, parts being broken away.

In the drawings, the numeral 6 designates the drive shaft, 7 a flanged coupling secured by key 8 to said shaft, 9 and 10 movable brake members, 11 a fixed brake member, and 12 the driven shaft secured by key 13 to the brake member 10.

The fixed brake member 11 includes an annular ring portion 14 having conical brake engaging faces 15 and an inwardly extending annular portion 16, said member 11 being fixed against rotational movement by a lug 17 held by an anchor bolt 18 to a fixed part 19.

The movable brake member 9 is in the form of an annular plate whose inner edge 20 is free to slide on a portion of the hub of the coupling 7 and whose outer edge 21 is conically tapered or inclined to frictionally engage the corresponding face 15 of the member 11.

The movable brake 10 has a disk portion 22 provided with an outer edge 23 which is conically tapered or inclined to frictionally engage the other face 15 of the member 11 and said disk has pin projections 24 integral therewith or secured thereto at spaced points and bolt housings 25 at other spaced points.

The flange 26 of the coupling extends between the member 9 and the disk portion 22 and is provided with sets of spaced holes 27 and 28. The pins 24 are free to slide in the holes 27 while studs or bolts 29 secured to the member 9 pass loosely through the holes 27 and elongated holes 30 in the disk portion 22.

Each bolt 29 has a coiled spring 31 mounted thereon and put under tension through the washer 32 and nuts 33 whereby there is a constant tendency for the brake elements 9 and 10 to be drawn into braking engagement with the fixed element 11.

At the points alined with the holes 27, the member 9 is provided with conical recesses 34 into which the conical ends 35 of the pins 24 project, these parts cooperating to move the brake members 9 and 10 to release position on the rotation of the drive shaft 6 due to the lost motion connection between the coupling 7 and the bolts 29 permitting relative angular movement between the pins 24 and the brake member 9 which permits the pins 24 to ride up the sides of the recesses 34 to release brake. So long then as the drive shaft 6 revolves, it revolves the brake members 9 and 10 with it through connections provided between the coupling 7, pins 24 and bolts 29 and thus through the slidable keyed connection between the member 10 and the shaft 12 drives the same. As soon as the rotation of the shaft 6 ceases however, the pins 24 are free to move back into the recesses 34 and the brake members 9 and 10 are then brought into frictional engagement with the brake member 11 when the action of the springs 31 and the drive of the shaft 12 is arrested or stopped.

While the cone type friction brake arrangement is preferred for most classes of work, the brake elements may in some instances be arranged as shown in Fig. 5 wherein the brake element 11' is generally similar to the fixed brake member 11 except that it has annular friction brake linings 36 mounted therein and the movable brake elements 9' and 10' are similar to the brake members 9 and 10 previously described except that they have flat surfaces 37 and 38 cooperating with the linings 36, the action being the same as in the first described construction.

The pipe 39 in Fig. 1 is used to supply lubricant to the passage 40 for lubricating the coupling.

I desire it to be understood that this invention is not to be limited to any particular form or arrangement of parts except in so far as such limitations are included in the claims.

What I claim as my invention is:

1. In a brake mechanism, the combination of a drive shaft, a driven shaft, a fixed brake element, a pair of movable brake elements engageable with said fixed brake element, means for driving said driven shaft from said drive shaft through said movable brake elements, means for automatically moving said movable brake elements out of engagement with said fixed brake element on the rotation of said drive shaft, and means for tensioning said movable brake elements.

2. In a brake mechanism, the combination of a drive shaft provided with a coupling, a fixed brake element surrounding said coupling, a pair of movable brake elements engageable with said fixed brake element and having driving connection with said coupling and one of them having angular movement relative thereto and to the other, a driven shaft connected to one of said movable brake elements, wedge means between said movable brake elements to automatically release the same from said fixed brake element on the rotation of said drive shaft, and means for tensioning said movable brake elements.

3. In a brake mechanism, the combination of a drive shaft provided with a coupling, a fixed brake element surrounding said coupling, a pair of movable brake elements disposed on opposite sides of said coupling and engageable with said fixed brake element, a driven member secured to one of said movable brake elements, said coupling having a plurality of sets of spaced openings, one of said movable brake elements having pin projections slidably mounted in one set of said openings, the other of said movable brake elements having cam recesses cooperating with said pin projections to release said movable elements from said fixed brake element, and tensioning means for said movable brake elements including parts passing loosely through the other set of opening in said coupling.

4. In brake mechanism the combination of a drive shaft provided with a coupling, a fixed brake element surrounding said coupling, a pair of movable brake elements disposed on opposite sides of said coupling and engageable with said fixed brake element, a driven member secured to one of said movable brake elements, a driving connection between said coupling and said brake elements including bolts having lost motion connection with said coupling, wedge means between said movable brake elements to automatically release the same from said fixed brake element on the rotation of said drive shaft, and spring means engageable with said bolts to move the movable brake elements into braking engagement with said fixed brake element.

5. In brake mechanism, the combination of a drive shaft provided with a coupling having a flange provided with spaced sets of openings, a fixed brake element surrounding the flange portion of said coupling and provided with braking surfaces, a pair of movable brake elements disposed on opposite sides of said flange and movable into braking engagement with said surfaces, bolts secured to one of said movable elements and slidably mounted in the other of said movable elements and loosely mounted in one set of the openings on said coupling, springs associated with said bolts to tension said brake elements, wedge means between said movable brake elements to move the same to release position including pins secured to one of said movable elements and slidably mounted in the other set of openings in the flange portion of said coupling, and a driven shaft connected to one of said movable brake elements.

In testimony whereof, I affix my signature.

FREDERICK W. SCHMITHALS.